(12) United States Patent
Kimura et al.

(10) Patent No.: US 8,360,565 B2
(45) Date of Patent: Jan. 29, 2013

(54) MATERIAL FOR AN INKJET INK COMPOSITION AND INKJET INK COMPOSITION

(75) Inventors: Okitoshi Kimura, Yokohama (JP); Soh Noguchi, Yokohama (JP)

(73) Assignee: Ricoh Company, Limited, Tokyo (JP)

( * ) Notice: Subject to any disclaimer, the term of this patent is extended or adjusted under 35 U.S.C. 154(b) by 46 days.

(21) Appl. No.: 12/878,521

(22) Filed: Sep. 9, 2010

(65) Prior Publication Data

US 2011/0060100 A1  Mar. 10, 2011

(30) Foreign Application Priority Data

Sep. 10, 2009  (JP) .................................. 2009-209636

(51) Int. Cl.
 *C09D 11/10* (2006.01)
(52) U.S. Cl. .............................. 347/88; 524/588; 522/77
(58) Field of Classification Search ................ 522/77; 347/88; 524/588
 See application file for complete search history.

(56) References Cited

U.S. PATENT DOCUMENTS

2008/0219129 A1*  9/2008  Kamada ................... 369/112.01

FOREIGN PATENT DOCUMENTS

| JP | 2001-64556 | 3/2001 |
| JP | 2002-80599 | 3/2002 |
| JP | 2004-182697 | 7/2004 |
| JP | 2004-262856 | 9/2004 |
| JP | 2004-262858 | 9/2004 |
| JP | 2005-126507 | 5/2005 |
| JP | 2005-255821 | 9/2005 |
| JP | 2005-325279 | 11/2005 |
| JP | 2005-330309 | 12/2005 |
| JP | 2006-193745 | 7/2006 |
| JP | 2008-266644 | 11/2008 |
| JP | 4226979 | 12/2008 |
| JP | 4233668 | 12/2008 |

OTHER PUBLICATIONS

Machine Translation of JP 2005-255821 A (Sep. 22, 2005).*
Machine Translation of JP 2005-187655 A (Jul. 14, 2005).*
Machine Translation of JP 2004-133436 A (Apr. 30, 2004).*
STN Structure Search Results (Mar. 23, 2012).*
"Study on Sorbit derivative", Industrial Chemical Magazine, 46th Edition, No. 8, Aug. 1943. 3 pages.
"Synthesis of low-molecular-weight gelator and its physical gel", Polymer Papers, vol. 55, No. 10, Oct. 1998. pp. 585-594.
"Oil Gelator", Polymer Processing, vol. 45, No. 1, 1996. pp. 21-26.

* cited by examiner

*Primary Examiner* — Vu A Nguyen
(74) *Attorney, Agent, or Firm* — Oblon, Spivak, McClelland, Maier & Neustadt, L.L.P.

(57) ABSTRACT

A material for an inkjet ink composition, including an organic solvent; and a siloxane compound comprising at least one organic group having an optically active site and an associative site in the molecule, wherein the organic solvent satisfies the following requirements a) to c):
 a) the siloxane compound is soluble in the organic solvent and does not precipitate after dissolved at room temperature;
 b) the siloxane compound can form an associative structure in the organic solvent at room temperature; and
 c) an inkjet ink composition prepared by dissolving the siloxane compound in an organic solvent is dischargeable from an inkjet nozzle.

11 Claims, 5 Drawing Sheets

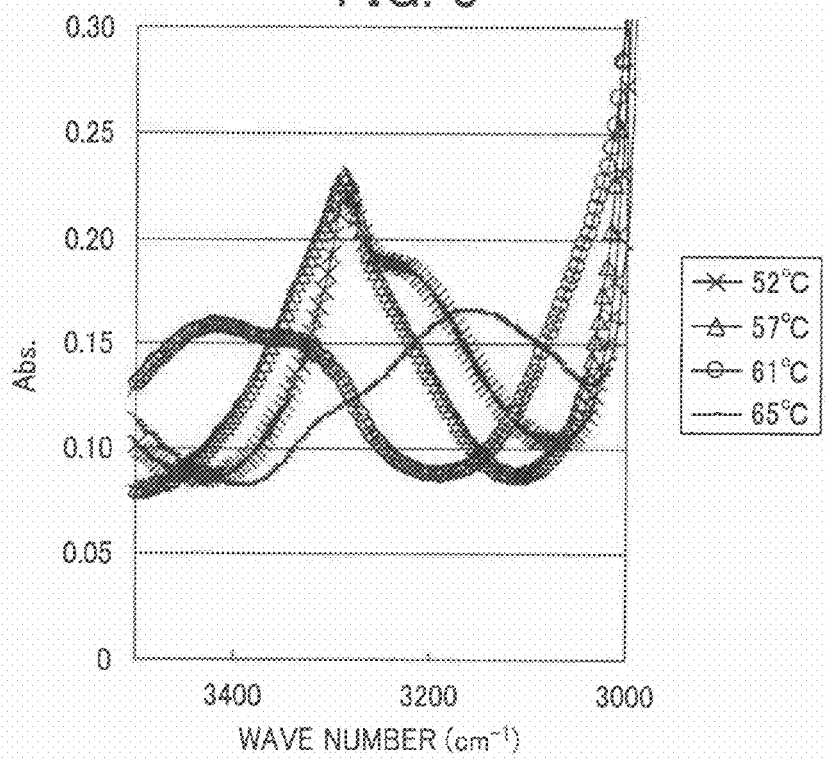
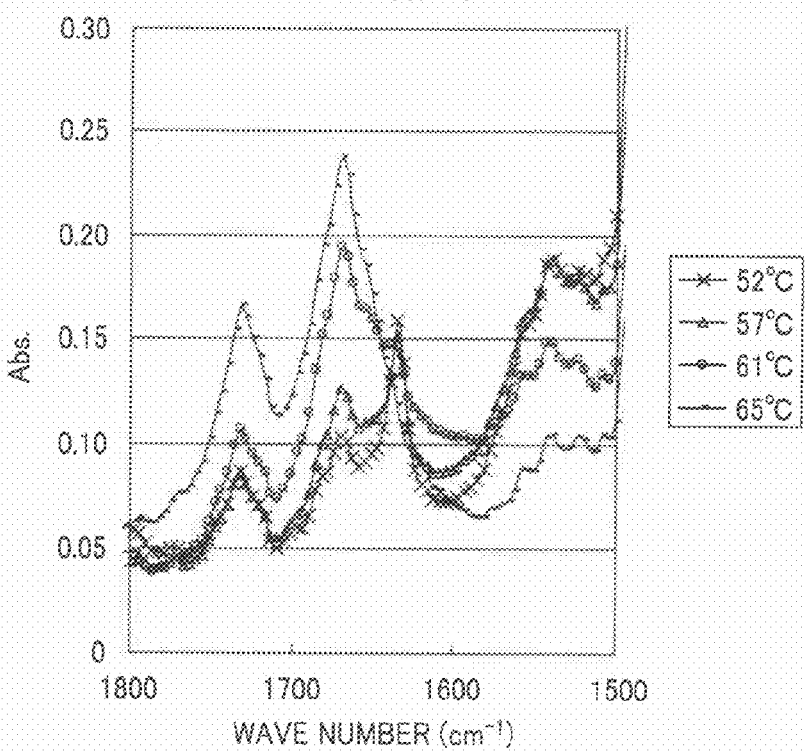

MATERIAL FOR AN INKJET INK COMPOSITION AND INKJET INK COMPOSITION

BACKGROUND OF THE INVENTION

1. Field of the Invention

The present invention relates to a material for an inkjet ink composition applicable to inkjet technologies applied to printing materials, electroconductive materials, optical filter materials and biosensor materials, and to an inkjet ink composition using the material.

2. Discussion of the Background

An inkjet recording method forms a desired pattern image on a medium such as paper based on a computer signal. The recording method is widely used as the apparatus is simple and inexpensive because it can directly place ink on a recording medium and the ink is very efficiently used because of being directed only onto a place needing the ink. The inkjet recording method is used not only in general image forming (printing) fields but also in producing electronic devices such as thin film transistor and biosensor formations, e.g., formation of channels with an organic semiconductor material and formation of wiring patterns. In addition, the inkjet recording method is used for producing color filters such as liquid crystals in the field of electronic displays because material is efficiently used and can be precisely placed at a desired position. Further, it is applied in 3D modeling as well because of the same reasons.

However, in all these applications, shape variation of an ink drop after being dropped onto a substrate is an important control element, and it is preferable that the drop does not expand or bleed more than necessary.

The shape variations cause bleeding, color mixing, through-penetration in printing on paper; deterioration of image resolution and disfigurement due to more expansion than necessary and color mixing in printing on impenetrable paper (or resin); and operation failures due to defective channel formation and wiring short-circuits in electronic devices. Further, the shape variations cause ink fall and unnecessary expansion, resulting in deterioration of modeling resolution in 3D modeling.

In order to solve these problems, an associative compound is included in an ink. The associative compound typically forms a network with its multimolecular bonds to confine a liquid (in this case ink) within the network. Associative compounds have been used for a long time and properties thereof are disclosed in, e.g., "Industrial Chemical Magazine" 46th edition No. 8 published in August, 1943 P779 "Study on Sorbit derivative"; "Polymer Papers" Vol. 55 No. 10, P585 (1998) "Synthesis of low-molecular-weight gelator and its physical gel"; and "Polymer Processing" Vo. 45, No. 1, P21 (1996) "Oil Gelator".

An ink including the associative compound forms a non-associative (low-viscosity, sol, or liquid) shape at high temperatures, and an associative (high-viscosity or solid-like (gel or solid)) shape at low temperatures.

When an ink including the associative compound is discharged from an inkjet head, the ink is heated to have low viscosity. After discharge, the ink is cooled to increase its viscosity or gel, and which prevents the ink from penetrating and expanding.

Japanese published unexamined applications nos. 2005-126507, 2005-255821, 2005-325279 and 2005-330309 disclose ink compositions using the associative compounds. However, trials using the associative compounds in many different solvents (inks) have not been conducted. The present inventors have found that some ink compositions using the associative compounds do not have sufficient associative capability or do not have stable associativity at low temperatures (Examples 1 to 21 and Comparative Examples 1 to 18).

Japanese Patent No. 4233668 discloses an ink composition using trans-4-tertiarybutyl-1-phenylcyclohexanol as an associative compound. However, trials using the associative compound in many different solvents (inks) have not been conducted, and effects on optically active material are not disclosed. The present inventors have found that such ink composition does not have sufficient associative capability (Examples 98 to 107).

Japanese published unexamined application No. 2001-64556 discloses an associative compound in a meltable material and an associative compound having a siloxane structure. Japanese published unexamined application No. 2006-193745 discloses an application of an associative compound similar to the associative compound having a siloxane structure for use in the present invention to an ink composition. Further, Japanese published unexamined application No. 2008-266644 discloses using an associative compound having a specific structure including a siloxane structure in a meltable material. However, trials of associative capabilities of the associative compounds when actually applied to ink compositions have not been conducted, effects on optically active material are not disclosed, and trials using the associative compounds in many different solvents (inks) have not been conducted. The present inventors have found that siloxane compounds having two silicon atoms do not have sufficient stability at low temperatures (Example 118).

The associative materials for use in the present invention are disclosed in Japanese published unexamined applications Nos. 2004-182697, 2004-262856, 2004-262858 and 2002-080599 and Japanese Patent No. 4226979. Japanese published unexamined applications Nos. 2004-182697, 2004-262856 and 2004-262858 discloses forming an associative body in a silicone oil. Japanese Patent No. 4226979 discloses forming an associative body in a ferroelectric liquid crystal. Japanese published unexamined application No. 2002-080599 discloses an associative material applicable in various organic liquids. However, trials involving forming an associative body (solid-like body) in solvents for inkjet use have not been conducted, and particularly trials of associativity in a polymeric compound have not been conducted. Further, features of an associative organic group for a siloxane structure are not disclosed.

For these reasons, a need exists for a material for an inkjet ink composition that is capable of forming a stable associative structure in many different solvents.

SUMMARY OF THE INVENTION

Accordingly, an object of the present invention is to provide a material for an inkjet ink composition, capable of forming a stable associative structure in many solvents.

Another object of the present invention is to provide an inkjet ink composition using the ink composition material.

These objects and other objects of the present invention, either individually or collectively, have been satisfied by the discovery of a material for an inkjet ink composition, comprising an organic solvent and a siloxane compound comprising at least one organic group having an optically active site and an associative site in the molecule. The organic solvent satisfies the following requirements a) to c):

a) the siloxane compound is soluble in the organic solvent and does not precipitate after dissolved at room temperature;

b) the siloxane compound can form an associative structure in the organic solvent at room temperature; and c) an inkjet ink composition prepared by dissolving the siloxane compound in an organic solvent is dischargeable from an inkjet nozzle.

These and other objects, features and advantages of the present invention will become apparent upon consideration of the following description of the preferred embodiments of the present invention taken in conjunction with the accompanying drawings.

BRIEF DESCRIPTION OF THE DRAWING

Various other objects, features and attendant advantages of the present invention will be more fully appreciated as the same becomes better understood from the detailed description when considered in connection with the accompanying drawings in which like reference characters designate like corresponding parts throughout and wherein:

FIG. 3 is a diagram showing an IR spectrum of a material for an inkjet ink composition of reference 1 (data from solid-like to liquid-like when heated);

FIG. 4 is a diagram showing an IR spectrum of a material for an inkjet ink composition of reference 1 (data from solid-like to liquid-like when heated);

DETAILED DESCRIPTION OF THE INVENTION

Figure 1:
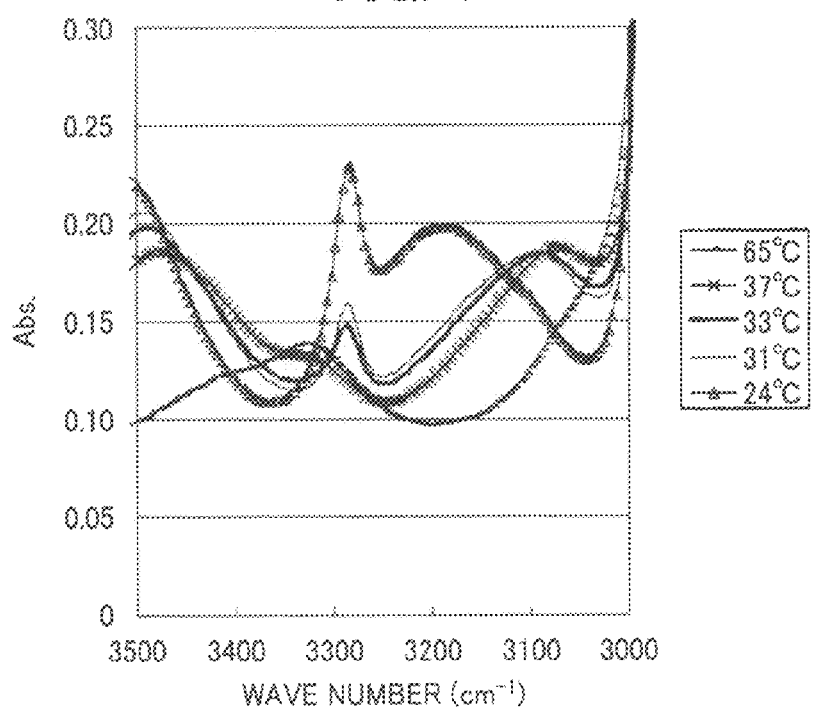
FIG. 1 is a diagram showing an IR spectrum of a material for an inkjet ink composition of reference 1 (data from liquid-like to solid-like when cooled)

The present invention provides a material for an inkjet ink composition, capable of forming a stable associative structure in many solvents. More particularly, the present invention relates to a material for an inkjet ink composition, comprising:

an organic solvent; and a siloxane compound comprising at least one organic group having an optically active site and an associative site in the molecule, wherein the organic solvent satisfies the following requirements a) to c):

a) the siloxane compound is soluble in the organic solvent and does not precipitate after dissolved at room temperature;

b) the siloxane compound can form an associative structure in the organic solvent at room temperature; and c) an inkjet ink composition prepared by dissolving the siloxane compound in an organic solvent is dischargeable from an inkjet nozzle.

The material for an inkjet ink composition of the present invention includes an organic solvent; and a siloxane compound comprising at least one organic group having an optically active site and an associative site in the molecule (hereinafter referred to as a "siloxane compound Z"). The siloxane compound Z is an associative compound and dissolved in an organic solvent.

An ink material such as a colorant is added to the material for an inkjet ink composition to prepare the inkjet ink composition (hereinafter referred to as an "ink composition" of the present invention).

The organic solvent needs to dissolve at least the siloxane compound Z. Water is not suitable as a solvent because the siloxane compound Z is not dissolved therein, but a mixture of water and an organic solvent can be used if the siloxane compound Z is dissolved therein with heat.

The siloxane compound Z may have a straight chain, a branched chain or a circular structure, preferably has a straight chain or a branched chain structure, and more preferably a straight chain structure in terms of solubility and associative capability.

Oligomer/polymer (including dimer and trimer) chain structure of the siloxane structure is not particularly limited if it is compatible with an organic solvent. In terms of compatibility, the siloxane compound Z is more soluble in various organic solvents than carbon bond structure, and preferably has low viscosity because of small affinity between the molecules.

However, the siloxane compound Z preferably has an active micro movement and low crystallinity qualitatively, and preferably has a glass transition temperature not greater than 25° C. physically. When greater than 25° C., the siloxane compound Z is difficult to dissolve and the resultant associative organization is likely to be rough and unstable.

Specifically, the siloxane compound Z preferably has the following formula (1):

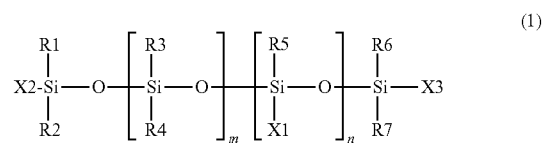

wherein R1 to R7 independently represent H, an alkyl group having 1 to 4 carbon atoms or a phenyl group; X1 to X3 independently represent H, an alkyl group having 1 to 4 carbon atoms, an alkoxy group having 1 to 4 carbon atoms, a phenyl group or an organic group having an associative site, and at least one of X1 to X3 is an organic group having an optically active site and an associative site; m represents an integer not less than 0; n represents an integer not less than 0 when X2 or X3 is an organic group having an optically active site and an associative site, and a positive integer when X2 and X3 are not an organic group having an optically active site and an associative site, and m+n≧1; and m and n represent a presence ratio of a repeat unit, and a bonding order of the repeat unit may be regular or irregular.

The organic group α in the formula (1) is an organic group introduced to a siloxane structure chain capable of forming an assembly with a force except a chemical reaction. A compound including such an organic group α forms an associative organization as an associative material. The associative organization is formed by a second associative strength except a covalent bond, i.e., intermolecular force bonds such as hydrogen bond, molecular orientation, helix formation and lamella formation, or ion bond. The temperature is typically increased to change the intermolecular force bond to be non-associative. pH and ion strength are typically varied to change the ion bond to be nonassociative. However, the associativity has to be stable at temperature higher than room temperature. The organic group is specifically produced by van der Waals force or π-π stacking arising from structures of hydrogen bonding compounds having an amide bond or a hydroxyl group, e.g., compounds having an amide bond such as amino acid compounds and urea compounds, sorbitol compounds and steroid compounds; materials having an ion component such as an asymmetric long-chain alkyl ammonium salt; or materials having no ion or a hydrogen bond such as cholesterol derivatives, polyfluoroalkyl compounds and long-chain alkoxyanthracene.

The organic group α may be included in a main chain or a side chain of the siloxane structure chain. When the siloxane structure includes only one organic group α, the organic group a needs two or more associative sites. This is because the present invention is on the assumption that the associative siloxane compound Z constructs a two-dimensional or a three dimensional organization. When the siloxane structure includes only one organic group α including only one associative site, the siloxane structure is a dimer which cannot achieve an object of the present invention.

When the siloxane structure includes only one organic group α including two or more associative sites, the effect of the present invention can be obtained but a more minute associative organization is difficult to obtain. This is because an associative organization having a simple structure is likely to be formed as the associative sites are limited.

The organic group α preferably has two or more associative sites, and more preferably three or more associative sites. The siloxane structure chain preferably includes two or more organic groups α, and more preferably three or more organic groups α. Thus, a more minute associative organization can be obtained. This is because the siloxane structure chain has amorphousness and the associative organization is complicated with plural associative sites.

The organic group α needs to have optical activity to increase the associative capability of a hydrogen-bonded associative organization. A racemic body having no optical activity has very low associative capability.

The associative organization is preferably formed of hydrogen bond. The associative organization formed by van der Waals force or π-π stacking has low associativity and insufficient heat resistance. The ion bond has high associative force, but has problems of corrosion and ion conduction due to ion components, and is not suitable for electronic device. The associative organization is preferably formed with a gelator having optical activity disclosed in "Development of Oil Gelator and Resolution of Gelating Function" in Polymer Papers Vol. 52 No. 12, P773 (1995) and "Oil Gelator" in Polymer Processing Vol. 45, No. 1, P21 (1996). The associative organization is most preferably formed of a hydrogen bond including a —NH— group and a —CO— group.

The organic group α preferably has the following formula (2):

—NHC*H(L)CO— or —C*H(L)NHCO—     (2)

wherein * is an optically active site and L is a univalent organic group.

Specifically, —R8—NHC*(R9)CO═R10, —R11-C*H(R9)—NH—CO—R12 or the organic group having the following formula (7) (including enantiomer) is preferably used.

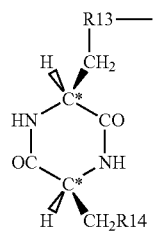

(7)

wherein * represents an optically active site; R8, R11 and R13 independently represent a divalent organic group including 1 to 18 carbon atoms, O and N; R10, R12 and R14 independently represent a univalent organic group including 1 to 24 carbon atoms, O and N; R9 represents an alkyl group having 10 or less carbon atoms, —CH$_2$Ph, —CH$_2$CH$_2$COOCH$_3$, —CH$_2$CH$_2$COOCH$_2$CH$_3$, —CH$_2$CH$_2$COOCH$_2$Ph or —CH$_2$CH$_2$CONH(CH$_2$)n$^0$CH$_3$ (Ph is a phenyl group and n$^0$ is an integer of from 1 to 9.

Further, the organic group α preferably has the following formulae (3) to (6), and (5) includes its enantiomer:

—(CH$_2$)n—CONHC*H(L1)CONHR13     (3)

wherein n represents an integer of from 1 to 18; * represents an optically active site; R13 represents an alkyl group having 1 to 24 carbon atoms; and L1 represents an alkyl group having 10 or less carbon atoms, —CH$_2$Ph, —CH$_2$CH$_2$COOCH$_3$, —CH$_2$CH$_2$COOCH$_2$CH$_3$ or —CH$_2$CH$_2$COOCH$_2$Ph (Ph is a phenyl group);

—(CH$_2$)n-CONHC*H(L1)CONHC*H(L2)CONHR13     (4)

wherein n represents an integer of from 1 to 18; * represents an optically active site; R13 represents an alkyl group having 1 to 24 carbon atoms; and L1 and L2 independently represent an alkyl group having 10 or less carbon atoms, —CH$_2$Ph, —CH$_2$CH$_2$COOCH$_3$, —CH$_2$CH$_2$COOCH$_2$CH$_3$ or —CH$_2$CH$_2$COOCH$_2$Ph (Ph is a phenyl group);

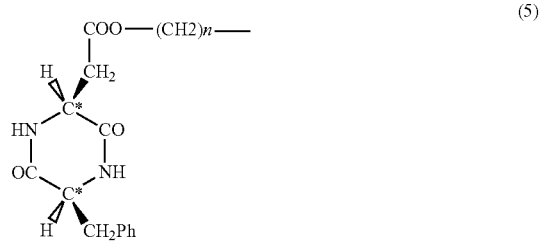

(5)

wherein n represents an integer of from 1 to 18; and * represents an optically active site; and

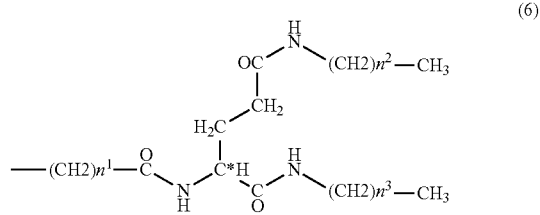

(6)

wherein $n^1$ represents an integer of from 1 to 18; $n^2$ and $n^3$ independently represents 0 or an integer of from 1 to 9; and * represents an optically active site.

L1 and L2 in the formulae (3) and (4) are preferably an alkyl group having 3 to 6 carbon atoms, and more preferably iso-$C_3H_7$ or sec-$C_4H_9$.

The organic group α is preferably bonded with the siloxane structure chain by a methylene chain —$(CH_2)n$-, and n is preferably 4 or more not to prevent movement of the siloxane structure chain and formation of an associative organization.

The organic group α is preferably a covalently-bonded side chain, and a ratio of the number of the organic group α to that of Si in the siloxane compound Z is preferably from 0.02 to 0.5. When less than 0.02, the associative capability is low. When greater than 0.5, an organic group having an optically-active site and that having an associative site are too close and begin to form an associative part in a molecule, an the associative capability is not improved for the number of the organic groups.

The number of Si is preferably from 3 to 82, m+n in the formula (1) is preferably from 1 to 80. When greater than 82, the molecular weight becomes relatively large. Therefore, when dissolved in an organic solvent and used as a material for an inkjet ink composition, the solution is difficult to discharge because of high viscosity. The solution is discharged at from 40 to 130° C. When the number of Si is 2 or less, the main chain structure is simple and the movement is small. Therefore, an associative body after dissolved in an organic solvent deteriorates in stability and storage stability, and the siloxane compound occasionally crystallized and separated when stored for long periods or at low temperature.

Further, the number of Si is preferably not less than 4 in terms of stability and storage stability of the associative body. In terms of viscosity, the number of Si is preferably not greater than 30, and more preferably not greater than 15. Therefore, in terms of both of the properties (stability, storage stability and viscosity), the number of Si is preferably from 4 to 30, and the number of the organic group α0 to that of Si is preferably from 0.1 to 0.5. Particularly when the number of Si is from 4 to 15, the number of the organic group α to that of Si is preferably from 0.2 to 0.5. Thus, a balanced material for an inkjet ink composition having good associative stability, storage stability (particularly at low temperature) and low viscosity can be provided.

The organic solvent for use in the present invention needs to satisfy all of the following conditions a) to c):

a) the siloxane compound Z is soluble in the organic solvent and does not precipitate at room temperature after dissolved;

b) the siloxane compound can form an associative structure in the organic solvent at room temperature; and c) an inkjet ink composition prepared by dissolving the siloxane compound in the organic solvent is dischargeable from an inkjet nozzle.

Various methods are available to verify the presence of an associative structure. For example, it can be indirectly verified when a material for an inkjet ink composition or a material for an inkjet ink composition prepared thereby is observed to be solid-like (gel) at low temperature and liquid-like (sol) at high temperature. It can be directly verified when an infrared absorption or an infrared absorption peak shift of the hydrogen bond is detected by an infrared spectroscope when the associative structure originates from the hydrogen bond.

The organic solvent preferably includes a compound and/or polymerizable compound which is a solid at room temperature and meltable with heat.

In the present invention, it is important that an ink drop has a small shape variation after dropping on a substrate. The compound which is a solid at room temperature and meltable with heat melts with heat and can be discharged when an ink is discharged, and is cooled to be solidified after discharged, which prevents expansion and bleeding of an ink drop more than necessary. A combination of the organic solvent and the siloxane compound Z can prevent an ink drop from expanding and bleeding.

After a solid organic solvent is melted with heat, the siloxane compound Z may be dissolved therein.

However, the organic solvent needs to have a melting point not higher than a temperature at which an associative body of the siloxane compound Z is formed. When not, the organic solvent is solidified before the siloxane compound Z is difficult to associate.

The polymerizable compound prevents the shape variation of an ink drop after dropping on a substrate by polymerization reaction. The organic solvent is preferably polymerizable with active light beam in particular, such as radical curable solvents, cation curable solvents and anion curable solvents.

The material for an inkjet ink composition preferably includes the siloxane compound Z in an amount not greater than 0.47% by weight, and a concentration thereof is preferably not higher than the following (a) or (b).

(a) a solution concentration of the composition material not including the siloxane compound at a temperature of its melting point plus 80° C., which is solid-like at room temperature.

(b) a solution concentration of the composition material not including the siloxane compound at 100° C., which is liquid-like at room temperature.

However, when the temperature of the melting point plus 80° C. in (a) is lower than 100° C., the concentration is not higher than that of (b).

When less than 0.47% by weight, the associative structure is unstable or the composition material does not change to be solid-like at room temperature. When the concentration is higher than (a) or (b), the associative structure is unstable and the composition material is likely to be crystallized when stored at room temperature for long periods or at low temperature Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The following solvents 1 to 3 were prepared.
<Solvent 1>
2-Phenoxyethylacrylate . . . 40.4% (KYOEISHA CHEMICAL Co., LTD.: LIGHT-ACRYLATE PO-A)
Tripropylene glycol diacrylate . . . 50.5% (TOAGOSEI Co., Ltd.: Aronix M-220)
2-Methyl-1-[4-(methylthio)phenyl]-2-morpholinopropan-1-one (Ciba Specialty Chemicals Corporation: IRGACURE 907) . . . 9.1%
<Solvent 2>
(3',4'-Epoxycyclohexane)methyl-3,4-epoxycyclohexane carboxylate (DAICEL CHEMICAL INDUSTRIES, LTD.: CELLOXIDE 2021P) . . . 31.7%
Ethyl-3-{[(3-ethyloxetan-3-yl)methoxy]methyl}oxetane (TOAGOSEI Co., Ltd.: OXT-221) . . . 63.5%
Sulfonium hexafluorophosphate salt mixture (Aldrich) . . . 4.8%

<Solvent 3>
Tetraethoxysilane . . . 42.7%
4-Hydroxybutyl vinyl ether (NIPPON CARBIDE INDUSTRIES CO., INC.: HBVE) . . . 10.7%
(3',4'-Epoxycyclohexane)methyl-3,4-epoxycyclohexane carboxylate (DAICEL CHEMICAL INDUSTRIES, LTD.: CELLOXIDE 2021P) . . . 42.7%
50% Solution of sulfonium hexafluorophosphate salt mixture in propylene carbonate (Aldrich) . . . 3.9%

<Association Test 1>

A brown sample bottle was charged with a solvent and an associative compound at room temperature, followed by addition of a ceramic ball having a diameter of 5 mm. This was heated to 110° C. to dissolve the associative compound in the solvent, followed by cooling to room temperature. The state where the ceramic ball did not move when the sample bottle was vigorously shaken was considered as an association state (solid-like).

While temperature increased by 5° C. from this state, the temperature at which the ceramic ball began to move when the sample bottle was shaken (the temperature at which the solvent became liquid-like) was recorded.

<Association Test 2>

A brown sample bottle was charged with a solvent and an associative compound at room temperature, followed by addition of a ceramic ball having a diameter of 5 mm. This was heated to 110° C. to dissolve the associative compound in the solvent. Thereafter, while temperature decreased by 5° C., the temperature at which the ceramic ball did not move when the sample bottle was shaken (the temperature at which the solvent became solid-like) was recorded.

Example 1

A siloxane compound 1 (described below) was added to the solvent 1 so that the siloxane compound 1 could represent 0.47% of the total, thereby preparing a material for an inkjet ink composition.

When the material was subjected to Association Test 1, the material became solid-like at room temperature. The temperature at which the material became liquid-like was 75° C.

Examples 2 to 21

The same test as in Example 1 was carried out using the solvents 1 to 3 and siloxane compounds 1 to 4 and 6 to 8 (described below) in combination as shown in Table 1. The values in Table 1 are the temperatures (° C.) at which the material became liquid-like during an increase in temperature after the material became solid-like at room temperature.

Comparative Example 1

The same process as in Example 1 was carried out except that a conventionally known associative compound "a" (described below) was used in place of the siloxane compound 1. At this time, the material did not become solid-like and remained liquid.

Comparative Examples 2 to 18

The same test as in Example 1 was carried out using the solvents 1 to 3 and associative compounds "a" to "f" (described below) in combination as shown in Table 2. The results are shown in Table 2. "x" in Table 2 shows that the materials did not become solid-like. The materials other than that in Comparative Example 14 did not become solid-like and remained liquid.

In other words, in the case of the conventionally known associative compounds, the materials did not become solid-like for all of the solvents 1 to 3. Therefore, it is found that the siloxane compounds used in the present invention are more excellent than the associative compounds.

Example 22

The siloxane compound 1 was added to the solvent 1 so that the siloxane compound 1 could represent 2.91% of the total, thereby preparing a material for an inkjet ink composition.

When the material was subjected to Association Test 1, the material was solid-like at room temperature. The temperature at which the material became liquid-like during an increase in temperature was 90° C.

Examples 23 to 57

The same test as in Example 22 was carried out using the solvents 1 to 3 and siloxane compounds 1 to 12 (described below) in combination as shown in Tables 3-1 and 3-2. The values in Tables are the temperatures (° C.) at which the material became liquid-like during an increase in temperature after the material became solid-like at room temperature.

Example 58

The siloxane compound 1 was added to an acrylate compound A1 (described below) as a solvent so that the siloxane compound 1 could represent 0.47% of the total, thereby preparing a material for an inkjet ink composition.

When the material was subjected to Association Test 1, the material was solid-like at room temperature. The temperature at which the material became liquid-like during an increase in temperature was 75° C.

Comparative Examples 19 to 24

The same process as in Example 58 was carried out except that conventionally known associating compounds "a" to "e", and "g" were used as shown in Table 4. The results are shown in Table 4. "x" in Table 4 shows that the materials did not become solid-like. The materials other than that in Comparative Example 23 did not become solid-like and remained liquid.

Example 59

The siloxane compound 8 was added to an acrylate compound A3 (described below) as a solvent so that the siloxane compound 8 could represent 0.47% of the total, thereby preparing a material for an inkjet ink composition.

When the material was subjected to Association Test 1, the material was solid-like at room temperature. The temperature at which the material became liquid-like during an increase in temperature was 80° C.

Comparative Examples 25 to 30

The same process as in Example 59 was carried out except that the conventionally known associating compounds "a" to "e", and "g" were used as shown in Table 5. The results are shown in Table 5. "x" in Table 5 shows that the materials did not become solid-like. The materials other than that in Comparative Example 29 did not become solid-like and remained liquid.

Examples 60 to 67

The siloxane compound 8 was added to each of acrylate compounds A2, A4, A5, and A7 to A11 (described below) shown in Table 6 as a solvent so that the siloxane compound 8 could represent 2.91% of the total, thereby preparing materials for an inkjet ink composition.

The materials were subjected to Association Test 1. The results are shown in Table 6. The values in Table 6 are the temperatures (° C.) at which the material became liquid-like during an increase in temperature after the material became solid-like at room temperature.

Examples 68 to 73

The siloxane compound 8 was added to each of glycidyl ether compounds G1 to G6 (described below) shown in Table 7 as a solvent so that the siloxane compound 8 could represent 2.91% of the total, thereby preparing materials for an inkjet ink composition.

The materials were subjected to Association Test 1. The results are shown in Table 7. The values in Table 7 are the temperatures (° C.) at which the material became liquid-like during an increase in temperature after the material became solid-like at room temperature.

Examples 74 to 78

The siloxane compounds 2, 3, 5, 6, and 8 were each added to an oxetane compound O4 (described below) as a solvent so that the compounds could each represent 0.47% of the total, thereby preparing materials for an inkjet ink composition.

The materials were subjected to Association Test 1. The results are shown in Table 8. The values in Table 8 are the temperatures (° C.) at which the material became liquid-like during an increase in temperature after the material became solid-like at room temperature.

Comparative Examples 31 to 36

The same process as in Examples 74 to 78 was carried out except that the conventionally known associating compounds "a" to "e", and "g" were used in place of the siloxane compounds shown in Table 8 as shown in Table 9.

The results are shown in Table 9. All of materials for an inkjet ink composition did not become solid-like and remained liquid.

Example 81

The siloxane compound 8 was added to a vinyl ether compound V1 (described below) as a solvent so that the siloxane compound 8 could represent 0.47% of the total, thereby preparing a material for an inkjet ink composition.

When the material was subjected to Association Test 1, the material was solid-like at room temperature. The temperature at which the material became liquid-like during an increase in temperature was 55° C.

Comparative Examples 37 to 45

The same process as in Example 81 was carried out except that the siloxane compound 8 was replaced with conventionally known associating compounds "a" to """ (described below). The results are shown in Table 10. "x" in Table 10 shows that the materials did not become solid-like. All of the materials did not become solid-like and remained liquid.

Examples 82 to 84

The siloxane compound 8 was added to each of vinyl ether compounds V1 to V3 shown in Table 11 (described below) as a solvent so that the siloxane compound 8 could represent 2.91% of the total, thereby preparing materials for an inkjet ink composition.

The materials were subjected to Association Test 1. The results are shown in Table 11. The values in Table 11 are the temperatures (° C.) at which the material became liquid-like during an increase in temperature after the material became solid-like at room temperature.

Examples 85 to 89

The siloxane compound 8 was added to each of epoxy compounds E1 to E5 shown in Table 12 (described below) as a solvent so that the siloxane compound 8 could represent 2.91% of the total, thereby preparing materials for an inkjet ink composition.

The materials were subjected to Association Test 1. The results are shown in Table 12. The values in Table 12 are the temperatures (° C.) at which the material became liquid-like during an increase in temperature after the material became solid-like at room temperature.

Example 90

The siloxane compound 8 was added to an alicyclic epoxy compound C4 (described below) as a solvent so that the siloxane compound 8 could represent 0.47% of the total, thereby preparing a material for an inkjet ink composition.

When the material was subjected to Association Test 1, the material was solid-like at room temperature. The temperature at which the material became liquid-like during an increase in temperature was 70° C.

Comparative Examples 46 to 51

The same process as in Example 90 was carried out except that the siloxane compound 8 was replaced with the conventionally known associating compounds "a" to "e", and "g". The results are shown in Table 13. "x" in Table 13 shows that the materials did not become solid-like. All of the materials did not become solid-like and remained liquid.

Examples 91 to 93

The siloxane compound 8 was added to each of alicyclic epoxy compounds C2 to C4 shown in Table 14 (described below) as a solvent so that the siloxane compound 8 could represent 2.91% of the total, thereby preparing materials for an inkjet ink composition.

The materials were subjected to Association Test 1. The results are shown in Table 14. The values in Table 14 are the temperatures (° C.) at which the material became liquid-like during an increase in temperature after the material became solid-like at room temperature.

Examples 94 to 97

The siloxane compounds 4 to 7 were each added to tetraethoxysilane as a solvent so that the siloxane compounds could each represent 2.91% of the total, thereby preparing materials for an inkjet ink composition.

The materials were subjected to Association Test 1. The results are shown in Table 15. The values in Table 15 are the temperatures (° C.) at which the material became liquid-like during an increase in temperature after the material became solid-like at room temperature.

Comparative Example 52

The conventionally known associating compound "a" was added to tetraethoxysilane as a solvent so that the associating compound could represent 2.91% of the total, thereby preparing a material for an inkjet ink composition.

When the material was subjected to Association Test 1, the material did not become solid-like and remained liquid.

Examples 98 to 107

The siloxane compounds 1 to 7, 9, and 11 to 12 shown in Table 16 were each added to ISOPAR L (Exxon) as a solvent so that the siloxane compounds could each represent 0.47% of the total, thereby preparing materials for an inkjet ink composition.

The composition materials were subjected to Association Test 2. The results are shown in Table 16. The values in Table 16 are the temperatures (° C.) at which the material became solid-like during a decrease in temperature after the material became liquid-like at 110° C.

Examples 108 to 117

The siloxane compounds 1 to 7, 9, and 11 to 12 shown in Table 17 were each added to ISOPAR L (Exxon) as a solvent so that the siloxane compounds could each represent 0.47% of the total, thereby preparing materials for an inkjet ink composition.

The composition materials were subjected to Association Test 1. The results are shown in Table 17. The values in Table 17 are the temperatures (° C.) at which the material became liquid-like during an increase in temperature after the material became solid-like at room temperature.

Examples 118 to 124

Low Temperature Stability Test

The materials for an inkjet ink composition in Examples 8 to 14 were stored at 0° C. for 1 hour and then observed.

After additional storage at 0° C. for 2 hours (3 hours in total), the materials were each held between two glass plates at 0° C. and crushed, to apply stress, and then observed. The results are shown in Table 18. With the exception of case of applying stress in Example 118, there is no change.
<Ink Composition 1>
40.4 parts of 2-phenoxyethyl acrylate (KYOEISHA CHEMICAL Co., LTD.: LIGHT-ACRYLATE PO-A) and 50.5 parts of tripropylene glycol diacrylate (TOAGOSEI Co., Ltd.: Aronix M-220) were mixed, and to the mixture was added a dispersant.

2.73 parts of black pigment (Ciba Specialty Chemicals Corporation: MICROLITH Black) was then added, and the mixture was sufficiently stirred and dispersed with a homogenizer. Thereafter, 9.1 parts of 2-methyl-1-[4-(methylthio) phenyl]-2-morpholinopropan-1-one (Ciba Specialty Chemicals Corporation: IRGACURE 907) was added and the mixture was stirred again, thereby preparing an ink composition 1.

Examples 125 to 131

0.47 part of each of the siloxane compounds 1 to 3, 6 to 8, and 11 shown in Table 19 was added to the ink composition 1, thereby preparing ink compositions. The ink compositions are equivalent to substances prepared by adding a black pigment to the respective materials for an inkjet ink composition prepared by adding 0.47% of the respective siloxane compounds to the solvent 1.

The ink compositions were subjected to Association Test 1. The results are shown in Table 19. The values in Table 19 are the temperatures (° C.) at which the material became liquid-like during an increase in temperature after the material became solid-like at room temperature.

From the results in Table 19, it is found that the ink compositions have the ability of becoming solid-like even if a black pigment is added.

Comparative Examples 53 to 57

0.47 part of each of the associating compounds "b" to "f" shown in Table 20 was added to the ink composition 1, thereby preparing ink compositions. The ink compositions are equivalent to substances prepared by adding a black pigment to the respective materials for an inkjet ink composition prepared by adding 0.47% of the respective associating compounds to the solvent 1.

The ink compositions were subjected to Association Test 1. The results are shown in Table 20. "x" in Table 20 shows that the ink compositions did not become solid-like. The ink compositions other than that in Comparative Example 53 did not become solid-like and remained liquid.

Examples 142 to 144

The siloxane compound 8 was added to compounds which are solid at room temperature as shown in Table 21 (STA, M9576, and GM-18S) as a solvent so that the siloxane compound 8 could represent 2.91% of the total, thereby preparing materials for an inkjet ink composition.

Association Test 1 was carried out using the materials and a solvent without the siloxane compound 8 added. The results are shown in Table 21. The values in Table 21 are the temperatures (° C.) at which the material became liquid-like during an increase in temperature after the material became solid-like at room temperature. As seen from Table, the solvent with the siloxane compound 8 added becomes liquid-like at higher temperature. It is found that the solvent has association ability.

Further, STA refers to stearyl acrylate (OSAKA ORGANIC CHEMICAL INDUSTRY LTD.), M9576 stearyl acrylate (NOF CORPORATION), and GM-18S butyl stearate (Nikko Chemicals co., ltd.).

Examples 145 to 153

2.91% of Siloxane compounds 13 to 15 (described below) were each added to each of the solvents 1 to 3 in combination as shown in Table 22, thereby preparing materials for an inkjet ink composition.

The materials were subjected to Association Test 1. The results are shown in Table 22. The values in Table 22 are the temperatures (° C.) at which the material became liquid-like during an increase in temperature after the material became solid-like at room temperature.

Reference Example 1

Confirmation of Hydrogen Bond Through IR

The siloxane compound 8 was added to the oxetane compound O4 as a solvent so that the siloxane compound 8 could represent 2.91% of the total, the mixture was heated, uniformed, and brought back to room temperature, thereby preparing a material for an inkjet ink composition.

Figure 2:
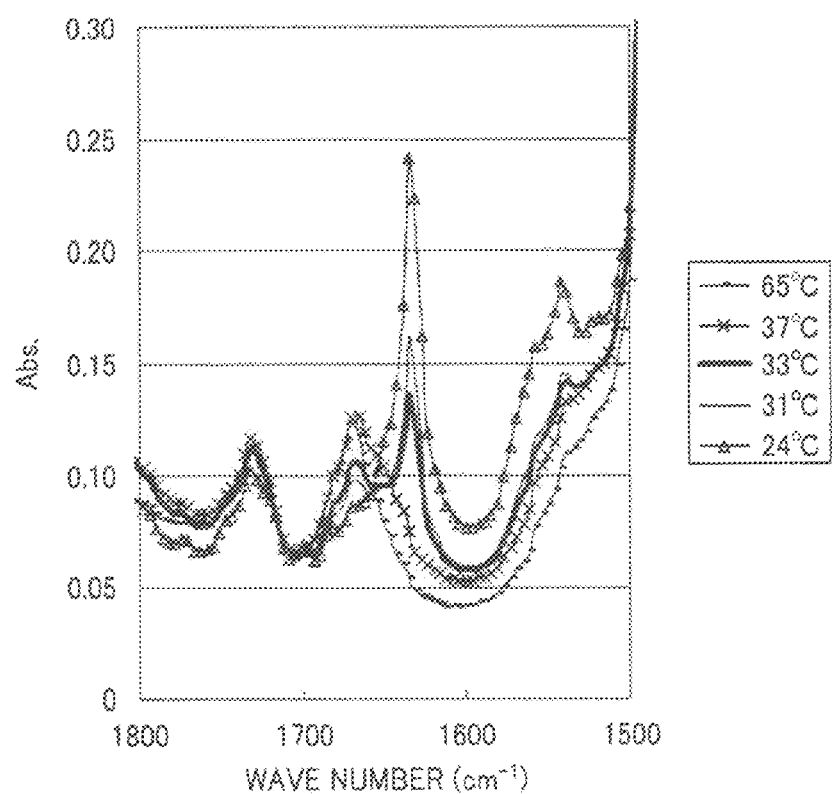
FIG. 2 is a diagram showing an IR spectrum of a material for an inkjet ink composition of reference 1 (data from liquid-like to solid-like when cooled)

The measured results of IR (infrared absorption) spectrum of the material are shown in FIGS. 1 to 4. FIGS. 1 and 2 show data when the material changes from liquid-like to solid-like during a decrease in temperature, and FIGS. 3 and 4 show data when the material changes from solid-like to liquid-like during an increase in temperature.

These figures confirm that there is a change at a part which is thought to show the absorption of both C=O and NH moieties contributing to a hydrogen bond. Specifically, the absorption of C=O shifts from 1670 $cm^{-1}$ to 1640 $cm^{-1}$ due to association, and the absorption of NH appears at 3290 $cm^{-1}$ due to association. In the changes of absorption of both C=O and NH, major changes at about 33° C. during a decrease in temperature and at about 61° C. during an increase in temperature are observed.

Reference Example 2

Confirmation of Hydrogen Bond Through IR

The siloxane compound 8 was added to the same STA as in Example 142 as a solvent so that the siloxane compound 8 could represent 2.91% of the total, the mixture was heated, uniformed, and brought back to room temperature, thereby preparing a material for an inkjet ink composition.

Figure 5:
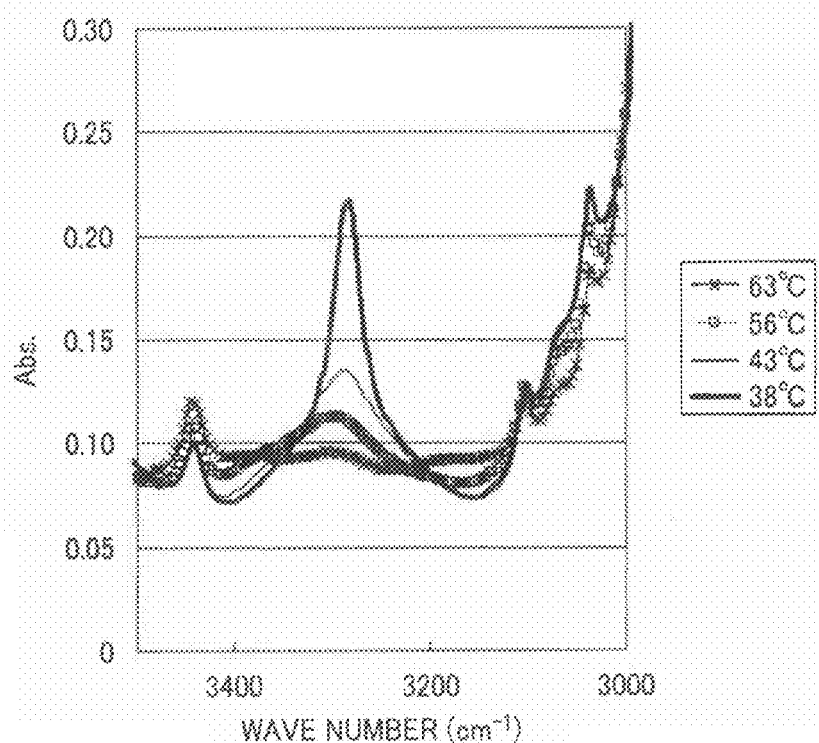
FIG. 5 is a diagram showing an IR spectrum of a material for an inkjet ink composition of reference 2 (data from liquid-like to solid-like when cooled)
Figure 6:
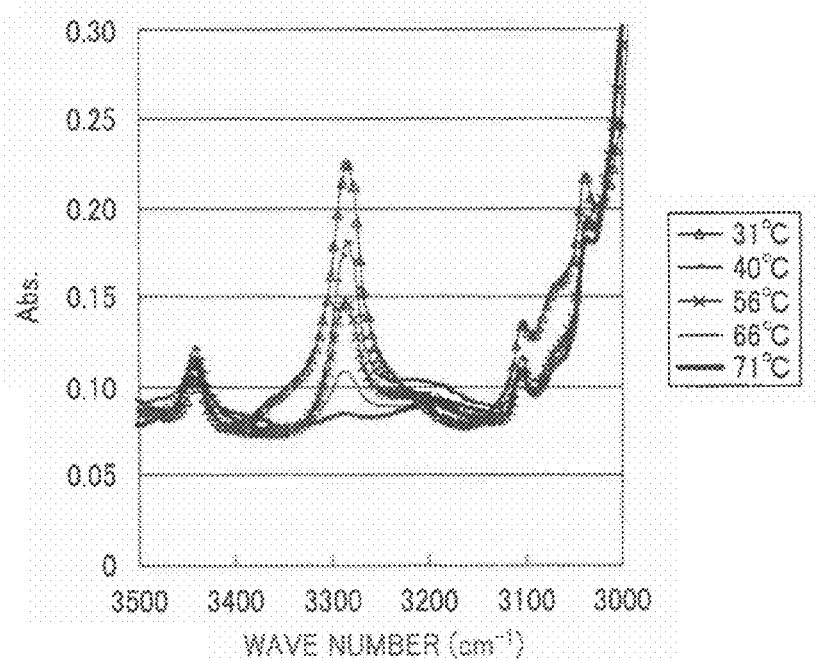
FIG. 6 is a diagram showing an IR spectrum of a material for an inkjet ink composition of reference 2 (data from solid-like to liquid-like when heated)

The measured results of IR spectrum of the material are shown in FIGS. 5 to 6. FIG. 5 shows data when the material changes from liquid-like to solid-like during a decrease in temperature, and FIG. 6 shows data when the material changes from solid-like to liquid-like during an increase in temperature.

These figures confirm that there is a change at a part which is thought to show absorption of NH contributing to a hydrogen bond. Specifically, the absorption of NH appears at 3290 $cm^{-1}$ in the association state. The absorption disappears at about 38° C. during a decrease in temperature, and disappears at about 71° C. during an increase in temperature.

<Ink Composition 2>

31.7 parts of (3',4'-Epoxycyclohexane)methyl-3,4-epoxycyclohexane carboxylate (DAICEL CHEMICAL INDUSTRIES, LTD.: CELLOXIDE 2021P) and 63.5 parts of ethyl-3-{[(3-ethyloxetan-3-yl)methoxy]methyl}oxetane (TOAGOSEI Co., Ltd.: OXT-221) were mixed, and to the mixture was added a dispersant.

2.86 parts of black pigment (Ciba Specialty Chemicals Corporation: MICROLITH Black) was then added, and the mixture was sufficiently stirred and dispersed with a homogenizer. Thereafter, 4.8 parts of sulfonium hexafluorophosphate salt mixture (Aldrich) was added and then the mixture was stirred again, thereby preparing an ink composition 2.

<Ink Composition 3>

42.7 parts of tetraethoxysilane, 10.7 parts of 4-hydroxybutyl vinyl ether (NIPPON CARBIDE INDUSTRIES CO., INC.: HBVE), and 42.7 parts of (3',4'-epoxycyclohexane)methyl-3,4-epoxycyclohexane carboxylate (DAICEL CHEMICAL INDUSTRIES, LTD.: CELLOXIDE 2021P) were mixed, and to the mixture was added a dispersant.

2.88 parts of black pigment (Ciba Specialty Chemicals Corporation: MICROLITH Black) was then added, and the mixture was sufficiently stirred and dispersed with a homogenizer. Thereafter, 3.90 parts of 50% solution of sulfonium hexafluorophosphate salt mixture in propylene carbonate (Aldrich) was added and the mixture was stirred again, thereby preparing an ink composition 3.

<Ink Composition 4> (Addition of Siloxane Compound 4 to Ink Composition 1)

40.4 parts of 2-phenoxyethyl acrylate (KYOEISHA CHEMICAL Co., LTD.: LIGHT-ACRYLATE PO-A) and 50.5 parts of tripropylene glycol diacrylate (TOAGOSEI Co., Ltd.: Aronix M-220) were mixed, 30.7 parts of siloxane compound 4 was added, heated and dissolved.

To the mixture, a dispersant was then added, 2.73 parts of black pigment (Ciba Specialty Chemicals Corporation: MICROLITH Black) was added, and the mixture was sufficiently stirred and dispersed with a homogenizer.

9.1 parts of 2-methyl-1-[4-(methylthio)phenyl]-2-morpholinopropan-1-one (Ciba Specialty Chemicals Corporation: IRGACURE 907) was then added, and the mixture was stirred again, thereby preparing an ink composition 4.

<Ink Composition 5> (Addition of Siloxane Compound 6 to Ink Composition 2)

31.7 parts of (3',4'-Epoxycyclohexane)methyl-3,4-epoxycyclohexane carboxylate (DAICEL CHEMICAL INDUSTRIES, LTD.: CELLOXIDE 2021P) and 63.5 parts of ethyl-3-{[(3-ethyloxetan-3-yl)methoxy]methyl}oxetane (TOAGOSEI Co., Ltd.: OXT-221) were mixed. To the mixture, 3.07 parts of siloxane compound 6 was added, heated and dissolved.

To the mixture, a dispersant was then added, 2.86 parts of black pigment (Ciba Specialty Chemicals Corporation: MICROLITH Black) was added, and the mixture was sufficiently stirred and dispersed with a homogenizer.

4.8 parts of sulfonium hexafluorophosphate salt mixture (Aldrich) was added and the mixture was stirred again, thereby preparing an ink composition 5.

<Ink Composition 6> (Addition of Siloxane Compound 7 to Ink Composition 3)

42.7 parts of tetraethoxysilane, 10.7 parts of 4-hydroxybutyl vinyl ether (NIPPON CARBIDE INDUSTRIES CO., INC.: HBVE), and 42.7 parts of (3',4'-epoxycyclohexane)methyl-3,4-epoxycyclohexane carboxylate (DAICEL CHEMICAL INDUSTRIES, LTD.: CELLOXIDE 2021P) were mixed. To the mixture, 3.07 parts of siloxane compound 7 was added, heated and dissolved.

To the mixture, a dispersant was then added, 2.88 parts of black pigment (Ciba Specialty Chemicals Corporation: MICROLITH Black) was added, and the mixture was sufficiently stirred and dispersed with a homogenizer.

3.90 parts of 50% solution of sulfonium hexafluorophosphate salt mixture in propylene carbonate (Aldrich) was added and the mixture was stirred again, thereby preparing an ink composition 6.

Examples 154

The state of dot formation using the ink composition 4 through inkjet discharge (using a head manufactured by Ricoh Printing Systems, Ltd., and a printing controller manufactured by Genesis) was observed. Dots were formed on plain papers in a discharge amount of about 7 pL at a rate of about 7 m/sec and a distance of about 1 mm. About 10 seconds after the formation, the dots were observed through a microscope.

As a result, the dots had a diameter of 68 μm and did not bleed, and print through was not observed on the paper.

Examples 155 to 156

The same observation as in Example 154 was carried out except that the ink compositions 5 and 6 were used in place of the ink composition 4. The results are shown in Table 23. The dots had each a diameter of 72 μm and 75 μm, did not bleed, and print through was not observed on the paper.

Comparative Examples 58 to 60

The same observation as in Example 154 was carried out except that the ink compositions 1 to 3 were used in place of the ink composition 4. The results are shown in Table 24. The dots had each a large diameter, and bleeding and print through occurred. In addition, the diameter of dot cannot be accurately measured due to bleeding, and therefore is an approximate outer diameter.

Example 157

UV-Hardening Experiment of Solvent with Siloxane Compound Added

The solvent 1, "a solvent in Example 7 in which 0.47% of the siloxane compound 8 was added to the solvent 1" and "a solvent in Example 29 in which 2.91% of the siloxane compound 8 was added to the solvent 1" were prepared.

In addition, a glass cell having 1-cm$^2$ ITO electrodes on upper and lower glass plates and a gap of 9 μm (manufactured by HRC) was prepared.

The three kinds of solvents were each introduced into three glass cells. Introducing of the solvents was carried out by placing each cell on a heated hot plate, and using capillary phenomenon.

While the impedance of each of these cells was measured at room temperature, the cells were irradiated with light from a high-pressure mercury vapor lamp, and the change of absolute value of impedance was measured. The measuring conditions are as follows.

Amount of light within cell: 64 mW/cm$^2$ (intensity at 365 nm)

Light-irradiation timing: after 50 seconds

Measuring frequency: 1 KHz

Figure 7:
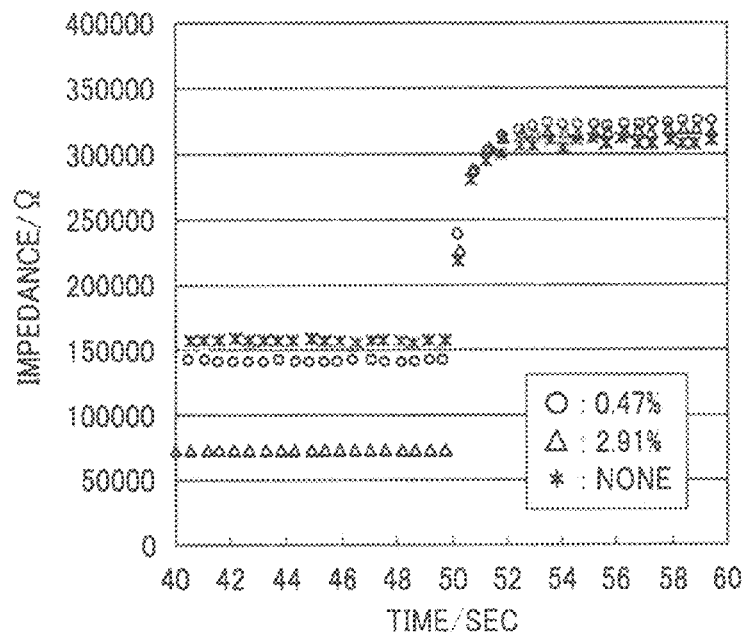
FIG. 7 is a diagram showing a result of an ultraviolet curing experiment in Example 157.

The results are shown in FIG. 7. Light-irradiation (after 50 seconds) and an increase in impedance were simultaneously observed. This confirms the phenomenon of hardening the solvent by ultraviolet rays and increasing the resistance.

Further, it is found that the solvent with the siloxane compound added is hardened at a rate equivalent to that of the solvent 1.

Example 158

UV-Hardening Experiment of Solvent with Siloxane Compound Added

The same evaluation as in Example 157 was carried out except that the solvent 2, "a solvent in Example 14 in which 0.47% of the siloxane compound 8 was added to the solvent 2" and "a solvent in Example 41 in which 2.91% of the siloxane compound 8 was added to the solvent 2" were prepared.

Figure 8:
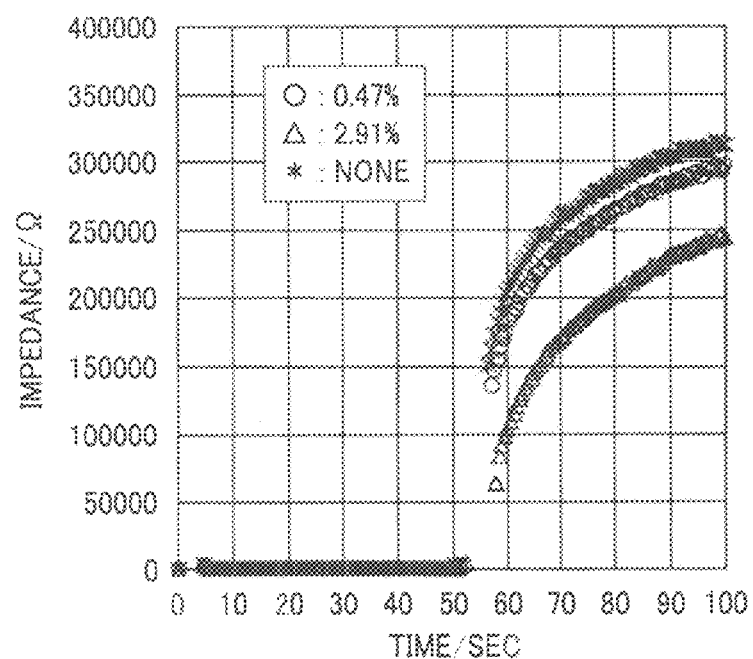
FIG. 8 is a diagram showing a result of an ultraviolet curing experiment in Example 158.

The results are shown in FIG. 8. After light-irradiation (after 50 seconds), an increase in impedance was observed. This confirms the phenomenon of hardening the solvent by ultraviolet rays and increasing the resistance. Although the hardening rate of the solvent with the siloxane compound added tends to be little slower as compared with the solvent 2, it is found that hardening progresses.

Example 159

UV-Hardening Experiment of Solvent with Siloxane Compound Added

The same evaluation as in Example 157 was carried out except that the solvent 3, "a solvent in Example 21 in which 0.47% of the siloxane compound 8 was added to the solvent 3" and "a solvent in Example 53 in which 2.91% of the siloxane compound 8 was added to the solvent 2" were prepared.

Figure 9:
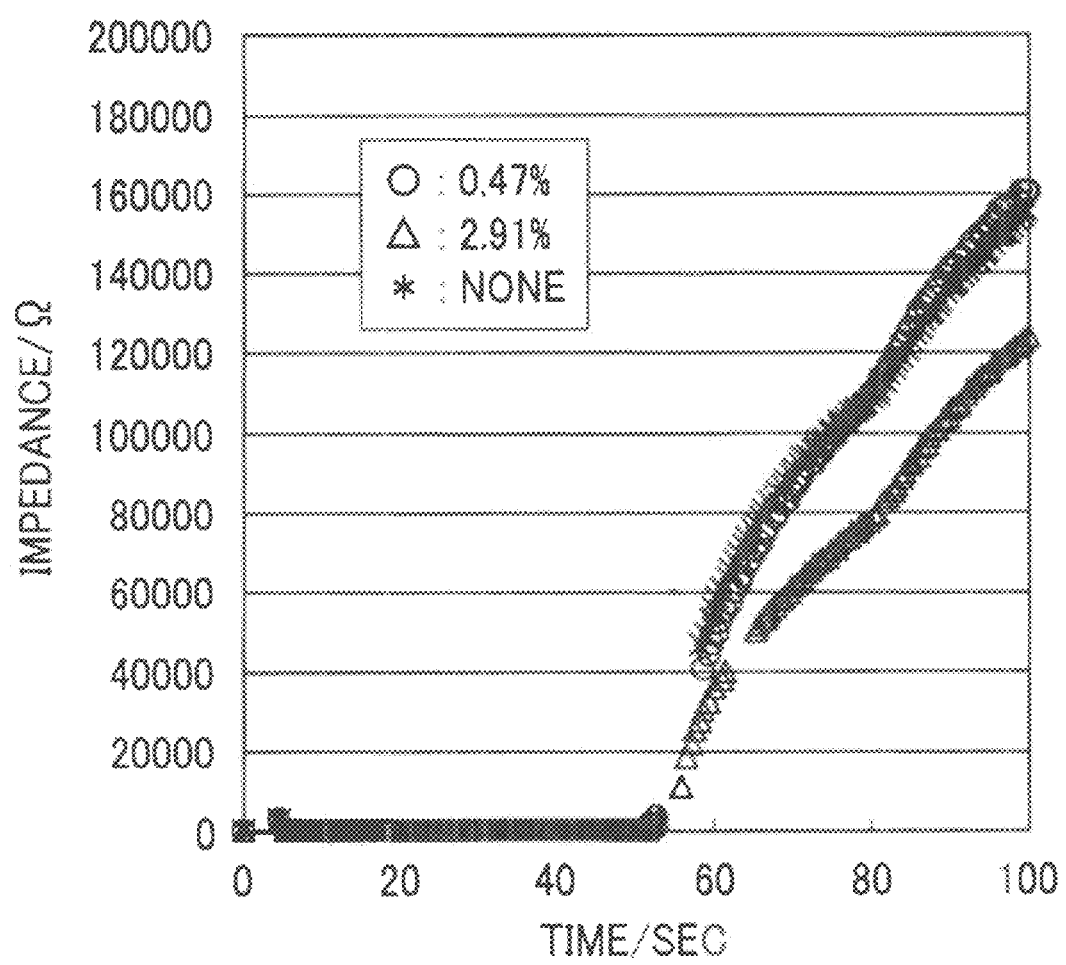
FIG. 9 is a diagram showing a result of an ultraviolet curing experiment in Example 159.

The results are shown in FIG. 9. After light-irradiation (after 50 seconds), an increase in impedance was observed. This confirms the phenomenon of hardening the solvent by ultraviolet rays and increasing the resistance. Although the hardening rate of the solvent with 2.91% of the siloxane compound added tends to be little slower as compared with the solvent 3, it is found that hardening progresses.

[Siloxane Compound 1]

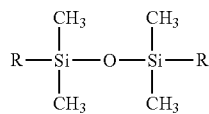

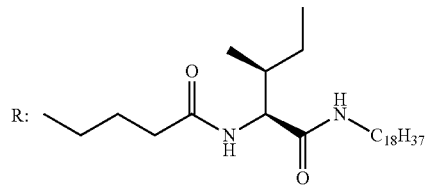

[Siloxane Compound 2]

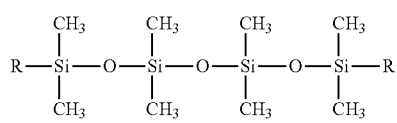

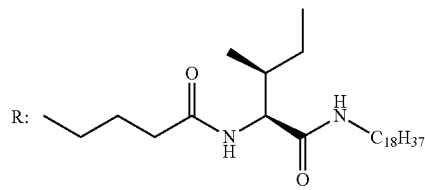

-continued
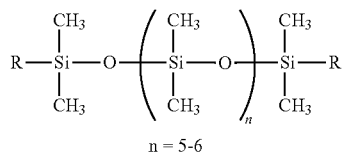
n = 5-6
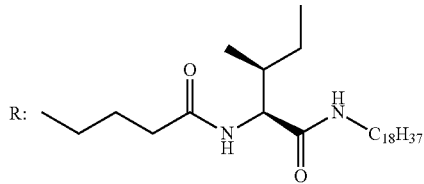
[Siloxane Compound 3]
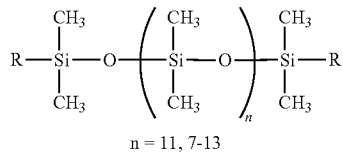
n = 11, 7-13
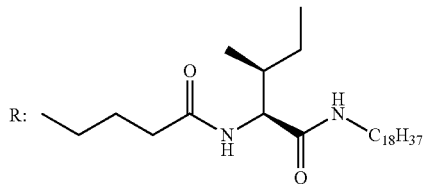
[Siloxane Compound 4]
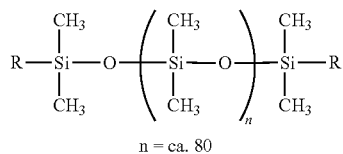
n = ca. 80
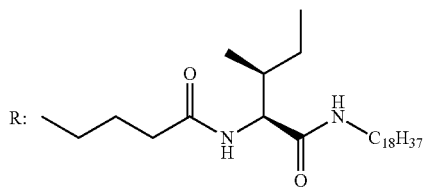
[Siloxane Compound 5]
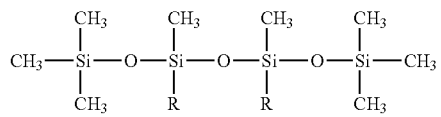
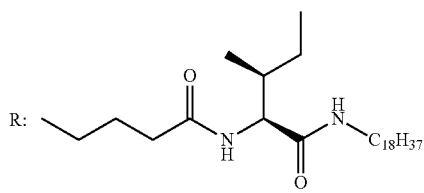
[Siloxane Compound 6]
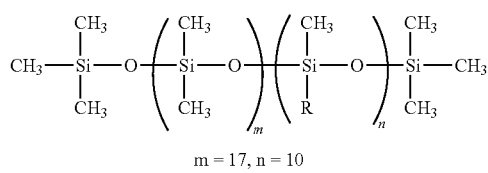
m = 17, n = 10
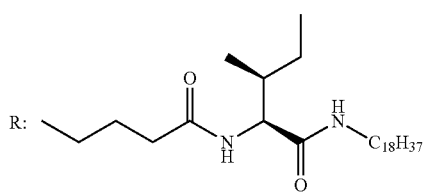
[Siloxane Compound 7]
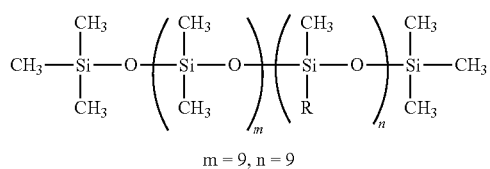
m = 9, n = 9
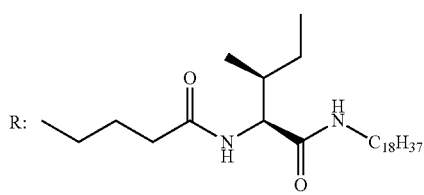
[Siloxane Compound 8]
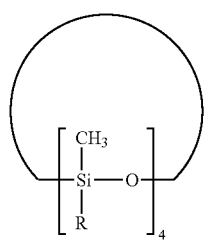
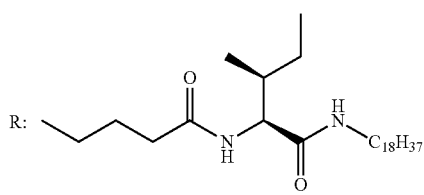
[Siloxane Compound 9]

-continued
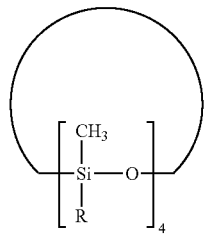
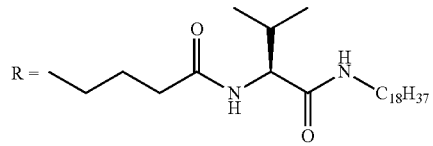
[Siloxane Compound 10]
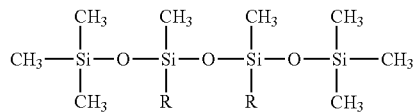
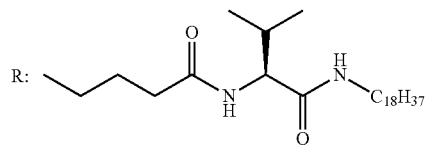
[Siloxane Compound 11]
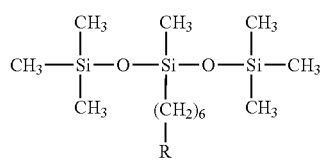
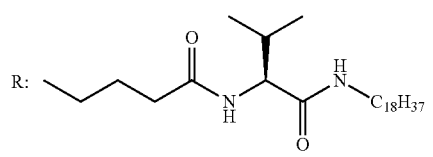
[Siloxane Compound 12]
[Siloxane Compound 13]
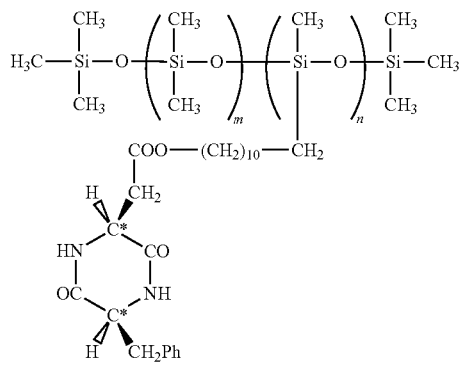
m = 9, n = 9
[Siloxane Compound 14]
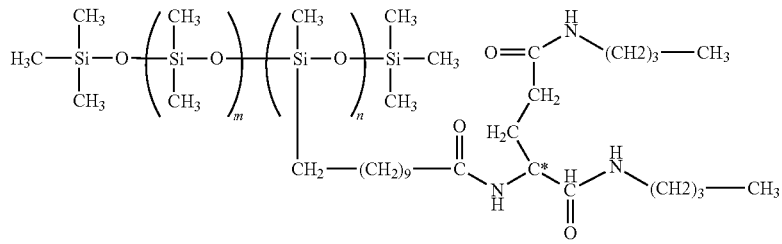
m = 9, n = 9
[Siloxane Compound 15]
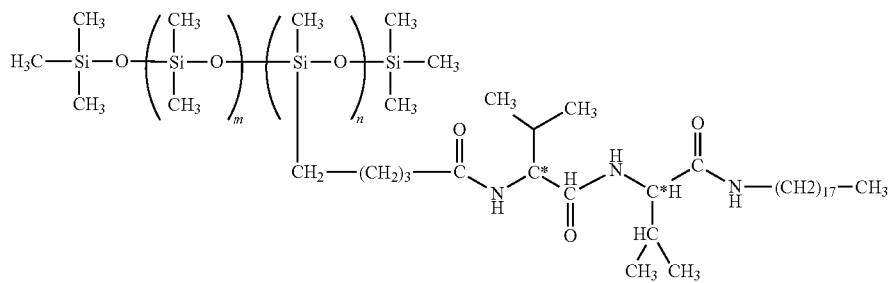
m = 9, n = 9

-continued
[Associative Compound a]
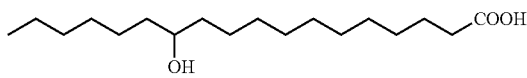
[Associative Compound b]
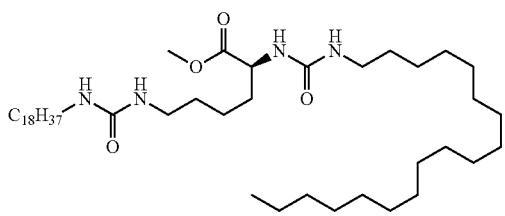
[Associative Compound c]
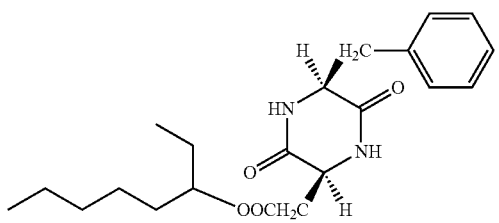
[Associative Compound d]
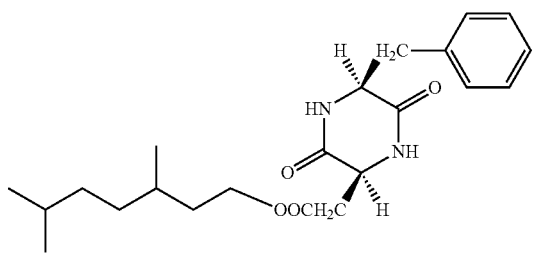
[Associative Compound e]
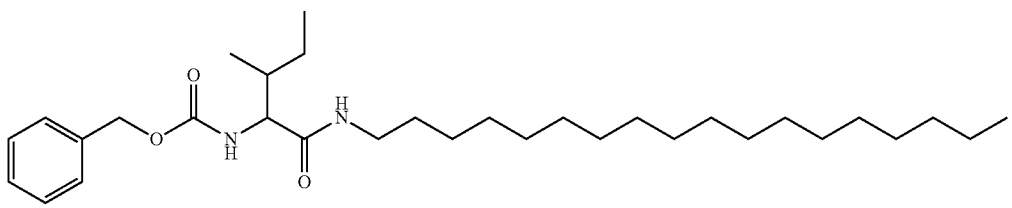
[Associative Compound f]
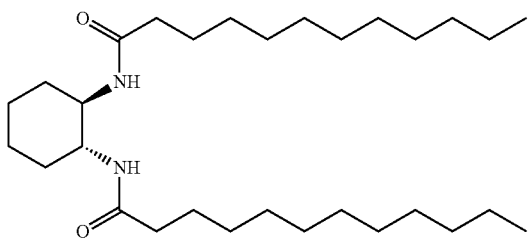
[Associative Compound g]
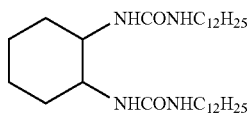
[Associative Compound h]
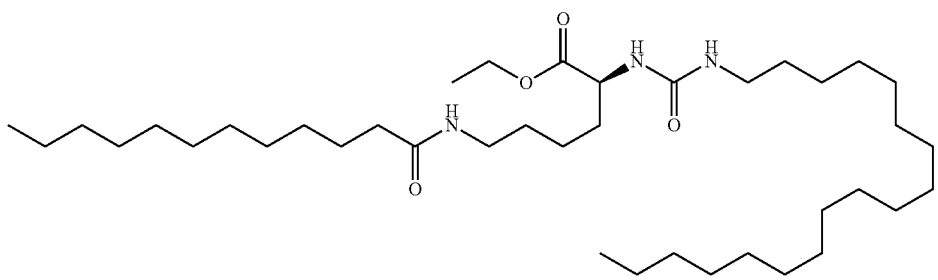
[Associative Compound i]
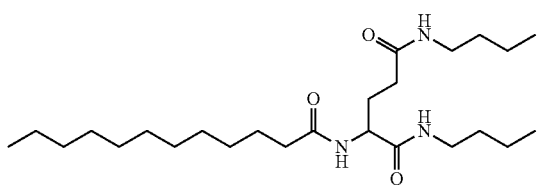
[Compound A1]
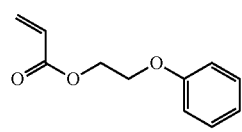
2-phenoxyethylacrylate (Light Acrylate PO-A from KYOEISHA CHEMICAL Co., LTD)

[Compound A2]

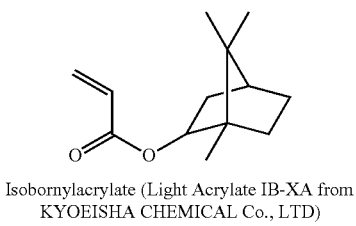
Isobornylacrylate (Light Acrylate IB-XA from KYOEISHA CHEMICAL Co., LTD)

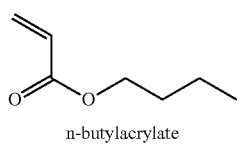
n-butylacrylate

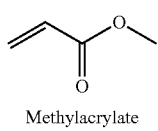
Methylacrylate

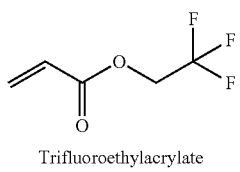
Trifluoroethylacrylate

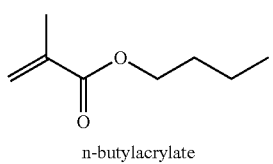
n-butylacrylate

-continued

[Compound A3]

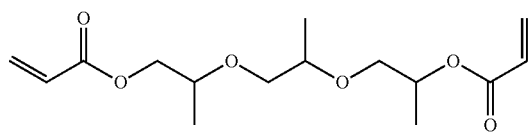
Tripropyleneglycoldiacrylate (ARONIX M-220 from Toagosei Co., Ltd.)

[Compound A4]        [Compound A5]

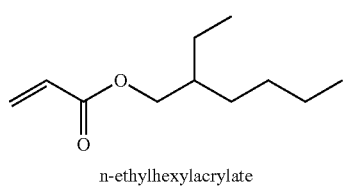
Trimethylolpropaneacrylate (ARONIX M-309 from Toagosei Co., Ltd.)

[Compound A7]        [Compound A8]

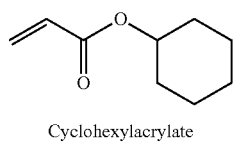
n-ethylhexylacrylate

[Compound A9]        [Compound A10]

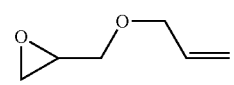
Cyclohexylacrylate

[Compound A11]       [Compound G1]

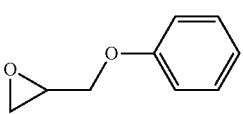
Allylglycidylether (EX-111 from Nagase ChemteX Corp.)

[Compound G2]        [Compound G3]

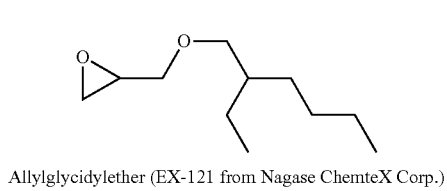
Allylglycidylether (EX-121 from Nagase ChemteX Corp.)     Allylglycidylether (EX-141 from Nagase ChemteX Corp.)

[Compound G4]        [Compound G5]

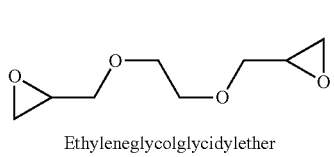
Ethyleneglycolglycidylether

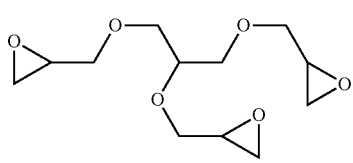
Glycerolpolyglycidylether (EX-314 from Nagase ChemteX Corp.)

-continued

[Compound G6]

Pentaerythritolglycidylether (EX-411 from Nagase ChemteX Corp.)

[Compound O4]

Ethyl-3{ [ (3-ethyloxetane-3-yl) methoxy] methyl} oxetane (OXT221 from Toagosei Co., Ltd.)

[Compound V1]

4-hydroxybutylvinylether (HBVE from Nippon Carbide Industries Co., Inc.)

[Compound V2]

Cyclohexylvinylether (CHVE from Nippon Carbide Industries Co., Inc.)

[Compound V3]

Butanedioldivinylether (BDVE from Nippon Carbide Industries Co., Inc.

[Compound E1]

Styreneoxide

[Compound E2]

Epoxyoctane

[Compound E3]

3- perfluorooctyl-1, 2-epoxypropane

[Compound E4]

1, 7-octadienediepoxide

[Compound E5]

1, 2-epoxy-5-hexene

[Compound C1]

Cyclohexeneoxide

[Compound C2]

2, 3-epoxypinane

[Compound C3]

1, 2-epoxy-cyclododecane

[Compound C4]

(3', 4'-Epoxycyclohexane) methyl-3, 4-epoxycyclohexane carobxylate CELLOXIDE 2021P from DAICEL CHEMICAL INDUSTRIES, LTD.)

TABLE 1

Results of Association Test 1

Siloxane Compound (0.47 wt %)

| Solvent | 1 | 2 | 3 | 4 | 6 | 7 | 8 |
|---|---|---|---|---|---|---|---|
| Solvent 1 | (Example 1) 75 | (Example 2) 75 | (Example 3) 70 | (Example 4) 70 | (Example 5) 75 | (Example 6) 85 | (Example 7) 70 |
| Solvent 2 | (Example 8) 50 | (Example 9) 60 | (Example 10) 60 | (Example 11) 50 | (Example 12) 60 | (Example 13) 80 | (Example 14) 50 |
| Solvent 3 | (Example 15) 65 | (Example 16) 60 | (Example 17) 60 | (Example 18) 55 | (Example 19) 60 | (Example 20) 65 | (Example 21) 45 |

TABLE 2

Results of Association Test 1

Associating Compound (0.47 wt %)

| Solvent | a | b | c | d | e | f |
|---|---|---|---|---|---|---|
| Solvent 1 | (Comparative Example 1) x | (Comparative Example 2) x | (Comparative Example 3) x | (Comparative Example 4) x | (Comparative Example 5) x | (Comparative Example 6) x |
| Solvent 2 | (Comparative Example 7) x | (Comparative Example 8) x | (Comparative Example 9) x | (Comparative Example 10) x | (Comparative Example 11) x | (Comparative Example 12) x |
| Solvent 3 | (Comparative Example 13) x | (Comparative Example 14) 50 | (Comparative Example 15) x | (Comparative Example 16) x | (Comparative Example 17) x | (Comparative Example 18) x |

TABLE 3-1

Results of Association Test 1

Siloxane Compound (2.91 wt %)

| Solvent | 1 | 2 | 3 | 4 | 5 | 6 |
|---|---|---|---|---|---|---|
| Solvent 1 | (Example 22) 90 | (Example 23) 90 | (Example 24) 70 | (Example 25) 80 | (Example 26) 65 | (Example 27) 90 |
| Solvent 2 | (Example 34) 70 | (Example 35) 75 | (Example 36) 65 | (Example 37) 65 | (Example 38) 60 | (Example 39) 75 |
| Solvent 3 | (Example 46) 75 | (Example 47) 75 | (Example 48) 70 | (Example 49) 65 | (Example 50) 60 | (Example 51) 75 |

TABLE 3-2

Results of Association Test 1

Siloxane Compound (2.91 wt %)

| Solvent | 7 | 8 | 9 | 10 | 11 | 12 |
|---|---|---|---|---|---|---|
| Solvent 1 | (Example 28) 95 | (Example 29) 85 | (Example 30) 80 | (Example 31) 95 | (Example 32) 90 | (Example 33) 60 |
| Solvent 2 | (Example 40) 85 | (Example 41) 75 | (Example 42) 80 | (Example 43) 85 | (Example 44) 75 | (Example 45) 30 |
| Solvent 3 | (Example 52) 75 | (Example 53) 80 | (Example 54) 80 | (Example 55) 90 | (Example 56) 75 | (Example 57) 50 |

TABLE 4

| | Comparative Example 19 | Comparative Example 20 | Comparative Example 21 | Comparative Example 22 | Comparative Example 23 | Comparative Example 24 |
|---|---|---|---|---|---|---|
| Associating Compound (0.47 wt %) | g | b | c | d | e | a |
| Results of Association Test 1 | x | x | x | x | 50 | x |

TABLE 5

|  | Comparative Example 25 | Comparative Example 26 | Comparative Example 27 | Comparative Example 28 | Comparative Example 29 | Comparative Example 30 |
|---|---|---|---|---|---|---|
| Associating Compound (0.47 wt %) | g | b | c | d | e | a |
| Results of Association Test 1 | x | x | x | x | 50 | x |

TABLE 6

|  | Solvent | Results of Association Test 1 |
|---|---|---|
| Example 60 | A2 | 65 |
| Example 61 | A4 | 65 |
| Example 62 | A5 | 80 |
| Example 63 | A7 | 60 |
| Example 64 | A8 | 65 |
| Example 65 | A9 | 85 |
| Example 66 | A10 | 60 |
| Example 67 | A11 | 65 |

TABLE 7

|  | Solvent | Results of Association Test 1 |
|---|---|---|
| Example 68 | G1 | 75 |
| Example 69 | G2 | 65 |
| Example 70 | G3 | 80 |
| Example 71 | G4 | 85 |
| Example 72 | G5 | 80 |
| Example 73 | G6 | 60 |

TABLE 8

|  | Example 74 | Example 75 | Example 76 | Example 77 | Example 78 |
|---|---|---|---|---|---|
| Siloxane Compound (2.91 wy %) | 2 | 3 | 5 | 6 | 8 |
| Results of Association Test 1 | 65 | 55 | 50 | 65 | 70 |

TABLE 9

|  | Comparative Example 31 | Comparative Example 32 | Comparative Example 33 | Comparative Example 34 | Comparative Example 35 | Comparative Example 36 |
|---|---|---|---|---|---|---|
| Associating Compound (2.91 wy %) | g | b | c | d | e | a |
| Results of Association Test 1 | x | x | x | x | x | x |

TABLE 10

| | Comparative Example 37 | Comparative Example 38 | Comparative Example 39 | Comparative Example 40 | Comparative Example 41 | Comparative Example 42 | Comparative Example 43 | Comparative Example 44 | Comparative Example 45 |
|---|---|---|---|---|---|---|---|---|---|
| Associating Compound (0.47 wt %) | g | b | c | d | e | a | h | f | i |
| Results of Association Test 1 | x | x | x | x | x | x | x | x | x |

TABLE 11

| | Solvent | Results of Association Test 1 |
|---|---|---|
| Example 82 | V1 | 75 |
| Example 83 | V2 | 55 |
| Example 84 | V3 | 65 |

TABLE 12

| | Solvent | Results of Association Test 1 |
|---|---|---|
| Example 85 | E1 | 70 |
| Example 86 | E2 | 55 |
| Example 87 | E3 | 70 |
| Example 88 | E4 | 75 |
| Example 89 | E5 | 60 |

TABLE 13

| | Comparative Example 46 | Comparative Example 47 | Comparative Example 48 | Comparative Example 49 | Comparative Example 50 | Comparative Example 51 |
|---|---|---|---|---|---|---|
| Associating Compound (0.47 wt %) | g | b | c | d | e | a |
| Results of Association Test 1 | x | x | x | x | x | x |

TABLE 14

| | Solvent | Results of Association Test 1 |
|---|---|---|
| Example 91 | C2 | 70 |
| Example 92 | C3 | 55 |
| Example 93 | C4 | 80 |

TABLE 15

| | Example 94 | Example 95 | Example 96 | Example 97 |
|---|---|---|---|---|
| Siloxane Compound (2.91 wt %) | 4 | 5 | 6 | 7 |
| Results of Association Test 1 | 75 | 75 | 75 | 60 |

TABLE 16

|  | Example 98 | Example 99 | Example 100 | Example 101 | Example 102 | Example 103 | Example 104 | Example 105 | Example 106 | Example 107 |
|---|---|---|---|---|---|---|---|---|---|---|
| Siloxane Compound (0.47 wt %) | 1 | 2 | 3 | 4 | 5 | 6 | 7 | 9 | 11 | 12 |
| Results of Association Test 2 | 25 | 30 | 35 | 30 | 30 | 30 | 30 | 35 | 35 | 20 |

TABLE 17

|  | Example 108 | Example 109 | Example 110 | Example 111 | Example 112 | Example 113 | Example 114 | Example 115 | Example 116 | Example 117 |
|---|---|---|---|---|---|---|---|---|---|---|
| Siloxane Compound (0.47 wt %) | 1 | 2 | 3 | 4 | 5 | 6 | 7 | 9 | 11 | 12 |
| Results of Association Test 1 | 55 | 60 | 65 | 60 | 60 | 60 | 45 | 60 | 50 | 45 |

TABLE 18

|  | Example 118 | Example 119 | Example 120 | Example 121 | Example 122 | Example 123 | Example 124 |
|---|---|---|---|---|---|---|---|
| Siloxane Compound | 1 | 2 | 3 | 4 | 6 | 7 | 8 |
| Storage at 0° C. for 1 hour | No change | No change | No change | No change | No change | No change | No change |
| Addition of stress | Crystal generation | No change | No change | No change | No change | No change | No change |

TABLE 19

|  | Example 125 | Example 126 | Example 127 | Example 128 | Example 129 | Example 130 | Example 131 |
|---|---|---|---|---|---|---|---|
| Siloxane Compound (0.47 wt %) | 1 | 2 | 3 | 6 | 7 | 8 | 11 |
| Results of Association Test 1 | 70 | 70 | 65 | 75 | 60 | 70 | 70 |

TABLE 20

|  | Comparative Example 53 | Comparative Example 54 | Comparative Example 55 | Comparative Example 56 | Comparative Example 57 |
|---|---|---|---|---|---|
| Associating Compound (0.47 wt %) | b | c | d | e | f |
| Results of Association Test 1 | 50 | x | x | x | x |

TABLE 21

|  | Solvent | Results of Association Test 1 (2.91 wt %) | Results of Association Test 1 (0 wt %) |
|---|---|---|---|
| Example 142 | STA | 55 | 35 |
| Example 143 | M9576 | 65 | 60 |
| Example 144 | GM-18S | 75 | 70 |

TABLE 22

|  | Siloxane Compound (2.91 wt %) | | |
|---|---|---|---|
| Solvent. | 13 | 14 | 15 |
| Solvent 1 | (Example 145) 90 | (Example 146) 85 | (Example 147) 80 |
| Solvent 2 | (Example 148) 80 | (Example 149) 75 | (Example 150) 70 |
| Solvent 3 | (Example 151) 85 | (Example 152) 75 | (Example 153) 70 |

TABLE 23

|  | Ink composition | Diameter | Bleeding | Print through |
|---|---|---|---|---|
| Example 154 | 4 | 68 | Absence | Absence |
| Example 155 | 5 | 72 | Absence | Absence |
| Example 156 | 6 | 75 | Absence | Absence |

TABLE 24

| | Ink composition | Diameter | Bleeding | Print through |
|---|---|---|---|---|
| Comparative Example 58 | 1 | 130-190 | Presence | Presence |
| Comparative Example 59 | 2 | 135-185 | Presence | Presence |
| Comparative Example 60 | 3 | 140-195 | Presence | Presence |

The inkjet ink composition of the present invention prevents bleeding, mixed color, penetration in printing on papers; deterioration of image resolution and disfigurement due to expansion more than necessary and mixed color in printing on impenetrable papers (or resins); and operation failures due to defective channel formation and wiring short in electronic device filed; deterioration of modeling resolution due to ink fall and unnecessary expansion in 3D modeling.

This application claims priority and contains subject matter related to Japanese Patent Application No. 2009-209636, filed on Sep. 10, 2009, the entire contents of which are hereby incorporated by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An inkjet ink composition, comprising:
   a colorant;
   organic solvent; and
   a siloxane compound comprising an organic group having an optically active site and an associative site,
   wherein:
   the siloxane compound is soluble in the organic solvent and does not precipitate at room temperature after being dissolved;
   the siloxane compound can form an associative structure in the organic solvent at room temperature; and
   the inkjet ink composition is dischargeable from an inkjet nozzle.

2. The inkjet ink composition of claim 1, wherein the siloxane compound has a formula (1):

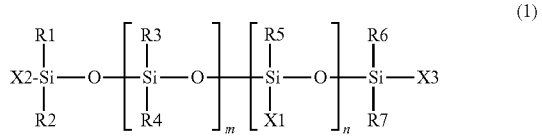

(1)

wherein:
   R1 to R7 each independently represent H, an alkyl group having 1 to 4 carbon atoms or a phenyl group;
   X1 to X3 each independently represent H, an alkyl group having 1 to 4 carbon atoms, an alkoxy group having 1 to 4 carbon atoms, a phenyl group or an organic group having an associative site, and at least one of X1 to X3 is an organic group having an optically active site and an associative site;
   m is an integer not less than 0;
   n is an integer not less than 0 when X2 or X3 is an organic group having an optically active site and an associative site, and a positive integer when X2 and X3 are not an organic group having an optically active site and an associative site, and m+n≧1; and
   m and n represent a presence ratio of a repeat unit, and a bonding order of the repeat unit may be regular or irregular.

3. The inkjet ink composition of claim 1, wherein the siloxane compound has two or more organic groups having an optically active site and an associative site.

4. The inkjet ink composition of claim 1, wherein a ratio of a number of organic groups to a number of Si atoms in the siloxane compound is from 0.02 to 0.5.

5. The inkjet ink composition of claim 1, wherein the associative site is formed of a hydrogen bond between a hydrogen of a partial structure of a —NH— group and an oxygen of a partial structure of a —CO— group.

6. The inkjet ink composition of claim 1, wherein the organic group has a formula (2):

(2)

wherein * is an optically active site and L is a univalent organic group.

7. The inkjet ink composition of claim 1, wherein the organic group has a formula selected from the group consisting of formulae (3) to (6):

(3)

wherein n is an integer of 1 to 18; * is an optically active site; R13 is an alkyl group having 1 to 24 carbon atoms; and L1 is selected from the group consisting of: an alkyl group having 10 or fewer carbon atoms, —CH₂Ph, —CH₂CH₂COOCH₃, —CH₂CH₂COOCH₂CH₃, and —CH₂CH₂COOCH₂Ph;

(4)

wherein n is an integer of 1 to 18; * is an optically active site; R13 is an alkyl group having 1 to 24 carbon atoms; and L1 and L2 are each independently selected from the group consisting of: an alkyl group having 10 or fewer carbon atoms, —CH₂Ph, —CH₂CH₂COOCH₃, —CH₂CH₂COOCH₂CH₃, and —CH₂CH₂COOCH₂Ph;

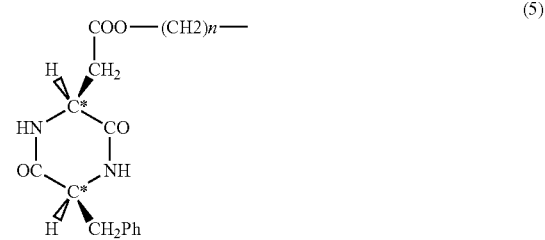

(5)

wherein n is an integer of 1 to 18; and * is an optically active site; and

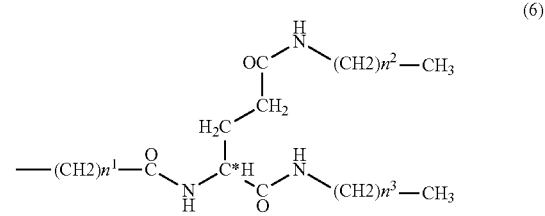

(6)

wherein $n^1$ is an integer of 1 to 18; $n^2$ and $n^3$ are each independently 0 or an integer of 1 to 9; and * is an optically active site.

8. The inkjet ink composition of claim 2, wherein m+n is 1 to 80.

9. The inkjet ink composition of claim 1, wherein the organic solvent comprises a compound, optionally polymerizable, which is a solid at room temperature and meltable with heat and has a melting point not higher than an association temperature of the siloxane compound.

10. The inkjet ink composition of claim 1, comprising 0.47% by weight or less of the siloxane compound, wherein a concentration of the siloxane compound is not higher than either (a) or (b):

(a) a solution concentration of the composition not including the siloxane compound, at a temperature of its melting point plus 80° C., which is solid-like at room temperature; and (b) a solution concentration of the composition not including the siloxane compound, at 100° C., which is liquid-like at room temperature.

11. The inkjet ink composition of claim 1, which is liquid-like at a discharge temperature when discharged from an inkjet nozzle and changes to become solid-like at a temperature ranging from below the discharge temperature when discharged to 20° C.

* * * * *